United States Patent

Sakai

[15] 3,707,703

[45] Dec. 26, 1972

[54] MICROPROGRAM-CONTROLLED DATA PROCESSING SYSTEM CAPABLE OF CHECKING INTERNAL CONDITION THEREOF

[72] Inventor: Toshinori Sakai, Tokyo, Japan

[73] Assignee: Hitachi, Ltd., Tokyo, Japan

[22] Filed: Nov. 17, 1970

[21] Appl. No.: 90,391

[30] Foreign Application Priority Data

Nov. 19, 1969 Japan ................................44/92167

[52] U.S. Cl. ................................................340/172.5
[51] Int. Cl. ................................................G06f 9/12
[58] Field of Search ....................................340/172.5

[56] References Cited

UNITED STATES PATENTS

| | | | |
|---|---|---|---|
| 3,445,818 | 5/1969 | Yen | 340/172.5 |
| 3,273,126 | 9/1966 | Owen et al. | 340/172.5 |
| 3,309,679 | 3/1967 | Weisbecker | 340/172.5 |
| 3,380,025 | 4/1968 | Ragland | 340/172.5 |
| 3,389,376 | 6/1968 | Packard | 340/172.5 |
| 3,391,394 | 7/1968 | Ottaway | 340/172.5 |
| 3,539,996 | 11/1970 | Bee et al. | 340/172.5 |
| 3,555,517 | 1/1971 | Heath et al. | 340/172.5 |
| 3,603,936 | 9/1971 | Attwood et al. | 340/172.5 |

*Primary Examiner*—Gareth D. Shaw
*Assistant Examiner*—Ronald F. Chapuran
*Attorney*—Craig, Antonelli, Stewart & Hill

[57] ABSTRACT

A microprogrammed data processing system which makes certain that the sequence control of instructions is being performed correctly and that the data processing system has predetermined internal conditions needed to carry out the instructions.

11 Claims, 2 Drawing Figures

INVENTOR
TOSHINORI SAKAI
BY Craig, Antonelli, Stewart & Hill
ATTORNEYS

INVENTOR

TOSHINORI SAKAI

BY Craig, Antonelli, Stewart & Hill
ATTORNEYS

MICROPROGRAM-CONTROLLED DATA PROCESSING SYSTEM CAPABLE OF CHECKING INTERNAL CONDITION THEREOF

BACKGROUND OF THE INVENTION

1. Field of the Invention

The present invention relates to a data processing system which is controlled by microprogramming, and more particularly to a data processing system capable of checking the internal conditions thereof.

2. Description of the Prior Art

Efforts at improvement have long been made to seek more capable data processing systems. In a data processing system, an error is inexcusable and for this reason it is equipped with an error detecting means for detecting errors in data processing operations and a means for retrying a correct operation when an error is detected. The conventional error detecting means is for detecting errors caused in arithmetic units including an adder and a data bus, and the error detecting operations are based on parity check. In other words, arithmetic results, transferred data and data read out of a memory are checked for errors in parity. It is of course very important for a data processing system to be provided with such an error detecting means. However, since a data processing system carries out instructions in accordance with a certain sequence and the various internal conditions of the data processing system, it is equally important to make sure that the sequence control is performed correctly and that things are going on inside the data processing system as originally scheduled for carrying out the instructions. The conventional data processing system is equipped with a means for detecting errors but not with any simple and effective means for checking the sequence control nor means for checking the internal conditions of the data processing system including those of a flip-flop. Under such circumstances, it can be said that no satisfactory measures are taken in the prior art to prevent erroneous operations of a data processing system.

SUMMARY OF THE INVENTION

An object of the present invention is to provide a data processing system provided with an effective means for checking the sequence control or the control of the internal conditions of the data processing system.

According to the present invention, a data processing system is provided with an indication unit for indicating the internal conditions of the data processing system and a check part of the micro-instructions, and the internal conditions specified by said check part are compared with those indicated by the indication unit for checking.

DESCRIPTION OF THE PREFERRED EMBODIMENT

Roughly speaking, micro-instructions consist of an operation part and a sequence control part, and the feature of the present invention is additional provision of a check part.

Figure 1:
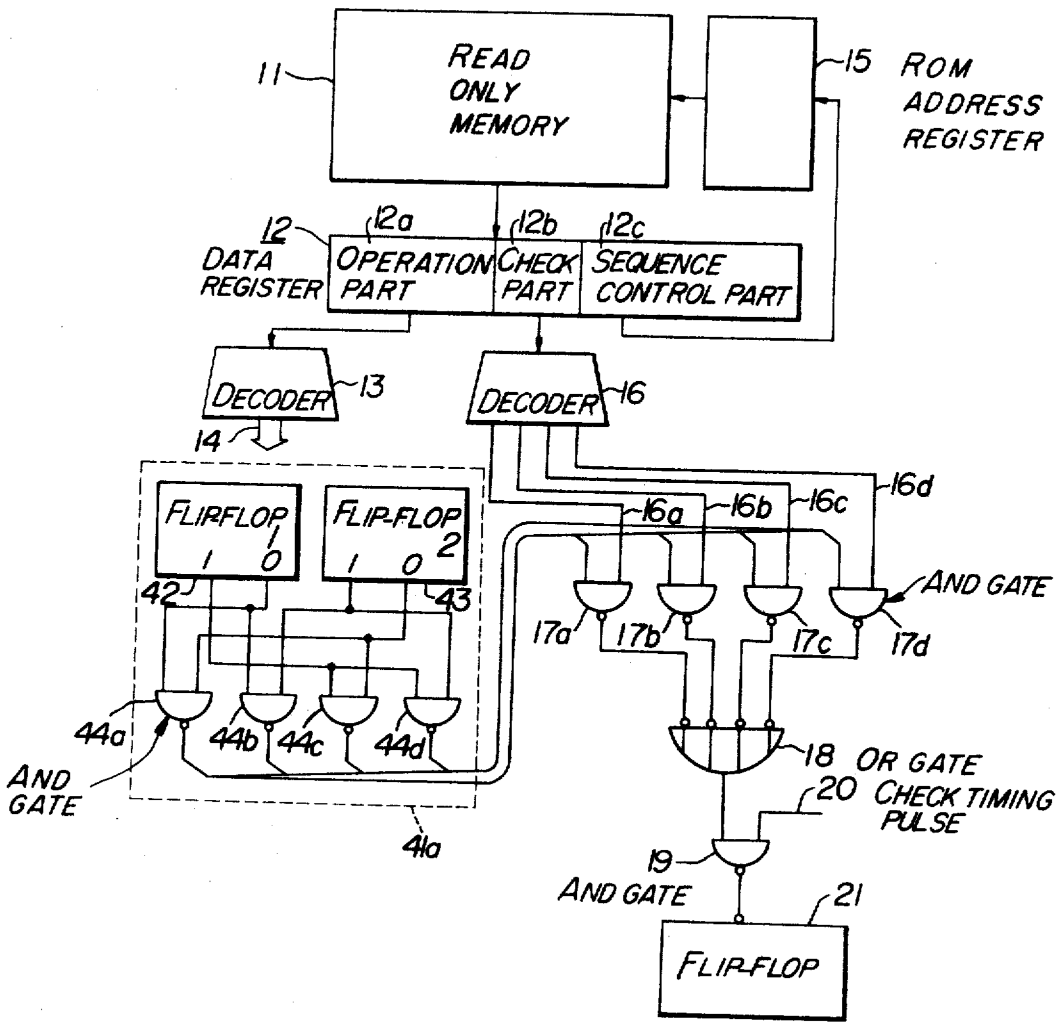
FIG. 1 is a block diagram showing an embodiment of the present invention.

Referring to FIG. 1, micro-instructions are read out of a read only memory 11 (hereinafter referred to as ROM) into a data register 12. The data register 12 consists of three sections 12*a*, 12*b* and 12*c*, the section 12*a* being provided with the operation part of a micro-instruction. The operation part set at the section 12*a* of the data register 12 is transferred to a decoder 13 and the decoded output 14 of the decoder 13 controls the operations in the data processor. The check part is set in the section 12*b* of the data register 12, and the sequence control part in the section 12*c* thereof. The section 12*c* specifies the address of a micro-instruction which is to be executed next, and which is transferred to the ROM address register 15. The check part set in the section 12*b* is transferred to a decoder 16, the output lines 16*a* to 16*d* of which constitute inputs to AND gates 17*a* to 17*d*, respectively. The other inputs to the AND gates 17*a* to 17*d* which will be described later carry information indicating the internal conditions of the data processing system, each of the AND gates 17*a* to 17*d* forming a comparator circuit for comparing the above-mentioned two different kinds of inputs. The check part set in the section 12*b* for checking micro-instructions is such that it issues an order to make certain that the internal conditions of the data processing system conform to the specified state at the time of execution of the micro-instructions, and the codes designated by the check part cause a signal to be applied through one of the output lines of the decoder 16 to one of the AND gates 17*a* to 17*d* thereby ordering checking. In the embodiment shown in FIG. 1, four different kinds of conditions can be checked and this number can be increased by adding bits to the check part. The AND gates 17*a* to 17*d* are connected with an OR gate 18, which is in turn connected with one of the inputs to an AND gate 19. The AND gate 19 is supplied with a check timing pulse through its other input line 20, so that the AND gate 19 is opened for the proper timing of checking. The AND gate 19 is connected with a flip-flop 21 which indicates an error.

What forms the basis of the present invention is the designation by the check part of what is to be checked, making sure that the things to be checked are in a specified condition suitable for execution of the micro-instructions.

The formats of instructions to be executed by micro-instructions are divided into the following four categories in principle with a brief description of their operations:

RR operations between two registers.

RX operations between a register and a main memory location.

SI operations between a main memory location and an immediate operands.

SS operations between two main memory locations.

Figure 2:
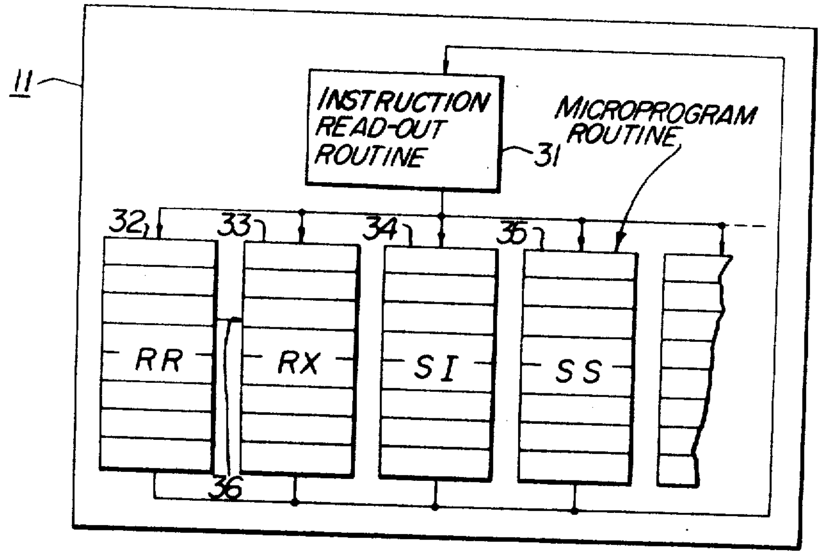
FIG. 2 is a diagram showing the construction of a micro program for explaining the present invention.

The construction of the micro program is illustrated in FIG. 2, in which the micro program is correlated with instruction words to be executed in accordance with said micro program. First, an instruction-readout routine 31 reads out an instruction word from a main memory (not shown in the drawing). Blocks 32, 33, 34, 35, . . . show routines of a micro program respectively for executing the instruction words of RR, RX, SI, SS and other formats. Assuming that the routine 31 reads out an instruction word of RR format, it is executed at the routine 32. After the execution of the instruction word, a signal returns to the routine 31 to read out the next instruction word, for example, the one of RX format. However, it may happen that a jump transfer is made erroneously to the routine 33 for executing instructions of RX format, as shown by the arrow 36, in the course of processing the instruction word of RR format. There has so far been no means known to easily and effectively find out such a sequence error, and therefore it is common practice to wrongly follow the routine 33 in accordance with the instruction of an RX format without detecting such an error.

The instruction words to be executed in accordance with the micro-instructions have a bit for identifying their own formats. In the case of the present embodiment which has four basic instruction formats as mentioned above, each instruction word is provided with two bits for identifying its own format as shown in Table 1.

TABLE 1

| Format | Format-identification bits |
|---|---|
| Instruction word of RR format | 00 |
| Instruction word of RX format | 01 |
| Instruction word of SI format | 10 |
| Instruction word of SS format | 11 |

According to the present invention, the above-mentioned sequence errors are detected in the manner mentioned below. Each of the AND gates 17*a* to 17*d* is also supplied with a signal from a block 41*a* which comprises a flip-flop (hereinafter referred to as FF) 1 denoted by numeral 42 and an FF2 denoted by numeral 43. The FF1 and FF2, which correspond to the bits for identifying the formats of instruction words to be executed in accordance with the micro-instructions, are both set and maintained at 0 when an instruction word of RR format is read out by the routine 31, whereas they are set at 0 and 1, respectively, when an instruction word read out is of an RX format. In like manner, they are set at 10 and 11, respectively, in the case of an instruction word of SI format or SS format. An AND gate 44*a* is supplied with 0 signals from FF1 and FF2, and the output of the AND gate 44a is applied to the AND gate 17*a*. When the set outputs of FF1 and FF2 are defined as at a high level with both of them set at 0, the output of the AND gate (actually a NAND gate as shown in FIG. 1) 44*a* becomes low in level. An AND gate 44*b* is supplied with the 0 output of FF1 and the 1 output of FF2, and the output of the AND gate 44*b* is applied to the AND gate 17*b*. An AND gate 44*c* is supplied with the 1 output of FF1 and the 0 output of FF2, while the output of the AND gate 44*c* is applied to the AND gate 17*c*. Further, an AND gate 44*d* is supplied with the 1 outputs from both FF1 and FF2, the output of the AND gate 44*d* being applied to the AND gate 17*d*.

The contents of the check part of the micro-instructions are defined in Table 2.

TABLE 2

| Check codes | Functions |
|---|---|
| 00 | makes sure that FF1 is 0 and FF2 0 |
| 01 | makes sure that FF1 is 0 and FF2 1 |
| 10 | makes sure that FF1 is 1 and FF2 0 |
| 11 | makes sure that FF1 is 1 and FF2 1 |

When an instruction word of RR format is read from the main memory, both FF1 and FF2 are set at 0. In executing the instruction word of format, the check part whose code is 00 in this case orders that it makes sure that FF1 and FF2 are both set at 0. For this purpose, the check part is decoded at the decoder 16 and produces a signal only on the output line 16*a*. Since, as mentioned above, FF1 and FF2 are both set at 0, the output of the AND gate 44*a* is at a low level and therefore the AND gate 17*a* is not opened. The remaining AND gates 17*b* to 17*d* also remain closed as no signal is applied to the input lines 16*b* to 16*d*. As a result, no error signal is obtained when a check timing pulse is applied on the line 20, and hence FF 21 for indicating an error is not energized.

Let us now assume that, in the course of the execution of an instruction word of RR format, a jump transfer is erroneously made to the routine for executing an instruction word of RX format as shown by the arrow 36 and that a micro-instruction for executing the instruction word of RX format is read by the data register 12. Then, the check part of the micro-instruction which indicates 01 orders, as shown in Table 2, that it has made certain that FF1 and FF2 are set at 0 and 1, respectively. As a consequence, a signal is produced on the output line 16*b* of the decoder 16 to select the AND gate 17*b*. The other input of the AND gate 17*b* is supplied from the AND gate 44b. Since both FF1 and FF2 are set at 0, the AND gate (actually a NAND gate) 44b produces a signal at a high level, whereby the AND gate 17*b* is opened and FF 21 is energized, thereby indicating that there is an error in the sequence of execution of the micro-instructions. In this way, the sequence control can be checked for an error by means of the check part of the micro-instructions.

The data processing system according to the present invention has another checking function as mentioned below. There are various flip-flops and signal lines contained in the data processing system for controlling the internal conditions. For correct execution of the subsequent data processing operations, it is necessary that these flip-flops and signal lines are in the predetermined conditions. Therefore, it is very important to check these conditions. According to the present invention, the check part is provided with additional bits, which are applied to the AND gate 17 (corresponding to the AND gates 17*a* to 17*d*) as one of the inputs thereto through the above-mentioned flip-flops, so that the check part of the micro-instructions designates where to be checked, thereby to make sure that said portion to be checked is in the predetermined conditions.

The internal conditions of the data processing system to be checked are not limited to those of flip-flops contained in the data processing system, but also include those of a signal line which connects with an external equipment such as the signal line which connects an input/output device with the data processing system. In the latter case, as in the former case, the signal line is connected with one of the AND gates 17*a* to 17*d* so that a designation is made by the check part of the micro-instructions.

In the above description, only one portion of the data processing system is designated for checking but it is possible to check simultaneously the logical conditions of sequence control, the conditions of channel equipment and the conditions of the signal lines connected with the input/output devices to make sure that they conform to the predetermined conditions, by making a certain designation at the check part of the micro-instructions.

Moreover, in spite of the fact that a part of the micro-instructions is allotted only to the check part in the above-mentioned embodiment, this can be changed as required. For example, let us consider 5 bits of information constituting a part of the micro-instructions. The combination of five bits makes it possible to designate $2^5 = 32$ codes. Out of these codes, 20 may be provided with the function of altering the internal conditions of the flip-flops instead of the checking operations, which are in this case performed by the remaining 12 codes. As described above, the alteration of the internal conditions may or may not be designated as occasion demands depending on whether the micro-instructions require a checking operation, since a part of the micro-instructions need not be necessarily allotted only for a checking operation.

It will be understood from the above description that, according to the present invention, in executing certain micro-instructions of a micro program, a part of the micro-instructions is used to check the internal conditions of a data processing system to see whether they conform to the predetermined conditions, so that a highly reliable data processing operations can be performed.

I claim:

1. A micro program controlled data processing system capable of checking the internal conditions thereof, comprising:

first means for storing micro-instructions including at least an operation part, a check part and a sequence control part;

second means, responsive to the contents of the check part of said first means, for decoding micro-instructions read out of said first means;

third means for indicating the internal conditions of the data processing system;

fourth means, responsive to the outputs of said second and third means, for comparing the output of said second means with the output of said third means; and fifth means, responsive to the output of said fourth means, for detecting the results of a comparison made by said fourth means, to indicate a malfunction.

2. A data processing system according to claim 1, in which said third means for indicating the internal conditions of said data processing system corresponds to bits for identifying the formats of instruction words executed in accordance with micro-instructions.

3. A data processing system according to claim 1, in which said fourth means comprises AND gates, each of which is supplied with a decoded output of the check part of the micro-instructions and a decoded indication output of said third means indicating the internal conditions of the data processing system.

4. A data processing system according to claim 1, in which said check part of said micro-instructions is capable of designating the internal conditions of a plurality of components of said data processing system and said fourth means is capable of comparing the internal conditions of a plurality of components of said data processing system designated by said check part of said micro-instructions with a plurality of conditions indicated by said third means.

5. A data processing system according to claim 1, in which said check part of the micro-instructions designates the internal conditions of the data processing system by means of each of the whole codes contained in a field.

6. A data processing system according to claim 1, in which said check part of the micro-instructions designates the internal conditions of the data processing system by means of each of a part of the codes contained in a field.

7. A method of checking the internal conditions of a micro program controlled data processing system comprising the steps of:

storing in a memory, which has at least an operation part a check part and a sequence control part, micro-instructions;

decoding the check part of the micro-instructions stored in said memory;

providing an indication corresponding to the internal conditions of the data processing system;

comparing the decoded micro-instructions with the indications of the internal conditions of the data processing system; and generating a malfunction indication when the results of said comparison step indicate a difference between a corresponding decoded micro-instruction and an indicated condition of the data processing system.

8. A method according to claim 6, wherein said indicating step includes the step of identifying the formats of the instruction words executed in accordance with micro-instructions.

9. A method according to claim 7, wherein said step of storing micro-instructions comprises storing the internal conditions of a plurality of components of the data processing system in said check part of said memory.

10. A method according to claim 7, wherein said comparing step comprises comparing the internal conditions of a plurality of components of the data processing system designated by the check part of said micro-instructions with a plurality of conditions of said data processing system.

11. A method according to claim 6, wherein said step of storing comprises designating the internal conditions of the data processing system by generating corresponding codes therefor.

* * * * *